United States Patent [19]

Uesugi et al.

[11] 4,110,008
[45] Aug. 29, 1978

[54] CUSHIONED OBJECTIVE LENS

[75] Inventors: Kyozo Uesugi, Izumi; Tsuneyo Metabi; Ryuzo Hachiken, both of Sakai, Japan

[73] Assignee: Minolta Camera Kabushiki Kaisha, Osaka, Japan

[21] Appl. No.: 770,959

[22] Filed: Feb. 22, 1977

[30] Foreign Application Priority Data

Mar. 2, 1976 [JP] Japan .................................. 51-22806

[51] Int. Cl.² ............................................. G02B 7/02
[52] U.S. Cl. .................................. 350/255; 354/195; 354/286
[58] Field of Search ............... 350/187, 252, 255, 257; 354/286, 195

[56] References Cited

U.S. PATENT DOCUMENTS

| | | | |
|---|---|---|---|
| 3,254,585 | 6/1966 | Gorey | 350/255 |
| 3,329,075 | 7/1967 | Padelt | 350/255 |
| 3,594,068 | 7/1971 | Kirstein | 350/187 X |
| 3,944,340 | 3/1976 | Hashimoto | 350/187 X |

*Primary Examiner*—F. L. Evans
*Attorney, Agent, or Firm*—Wolder, Gross & Yavner

[57] ABSTRACT

A buffer or cushion made of a plastic material is interposed between an external device exposed to the exterior of a lens barrel and an internal mechanism within the barrel of a lens to absorb any impact applied to the external device and transmitted toward the internal mechanism and the lens unit. The external device may include an ornament ring and a barrel head sleeve and the internal mechanism may include sleeves for shifting the lens unit and members for holding the lens unit.

13 Claims, 1 Drawing Figure

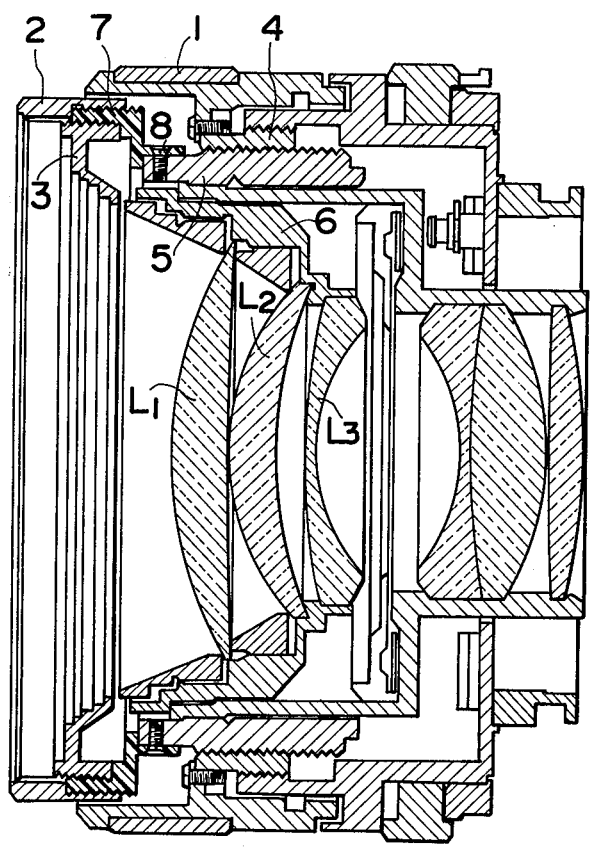
Figure

CUSHIONED OBJECTIVE LENS

BACKGROUND OF THE INVENTION

The present invention relates generally to improvements in optical devices and it relates particularly to an improved shock-proof lens barrel assembly.

In general, the conventional lens barrel is constructed of metal members of high rigidity, such as the operating ring which is exposed to the exterior of the lens barrel, the focussing means constituting an internal mechanism, one or more lens holding rings and the like. In addition, these members are directly interfitted or intercoupled providing a rigid assembly and construction. As a consequence, when a lens barrel is inadvertently struck by another article, or falls on the floor, then an impact is directly transmitted from an external member of the lens barrel to the internal mechanism, thus impairing the desired and proper functioning of the focussing mechanism or the optical system, or damaging the same. Once the damage occurs, then the function of the device as an optical instrument is diminished or lost and its repair, if possible, leads to an expenditure of much time and effort and is generally highly expensive.

SUMMARY OF THE INVENTION

It is accordingly an object of the present invention to provide a lens device such as an objective lens which will not suffer from loss of the desired and proper functioning of any internal mechanism and lens unit and damage thereto due to an impact applied to an external component of the lens device.

Another object of the present invention is to provide an improved lens barrel with a buffer or cushion of simple and rugged construction and of low manufacturing cost.

To accomplish the above objects, a lens barrel of the present invention includes a buffer or cushion interposed between an external component or bumper exposed to the exterior thereof and an internal mechanism disposed between a lens unit and the external component. With this construction, any impact exerted on the external component is absorbed by the buffer and weakened or highly attenuated when transmitted to the internal mechanism. As a result, there will be little or no danger of a strong impact being imparted to the internal mechanism and the lens unit, and thus these latter will not lose their desired or proper functioning nor will they be damaged.

The buffer is advantageously formed of a plastic or synthetic organic polymeric resin material which is in general less rigid and more flexible than a metallic material. Such a buffer of a plastic material can be manufactured by molding at low cost and will be simple in its construction and application.

In accordance with a preferred embodiment of the present invention, the buffer is advantageously made of a synthetic polymeric resin of high flexibility. The external component includes an ornament ring disposed in front of the lens unit and a barrel head sleeve disposed at a forwardmost portion of the lens barrel, the ornamental ring and barrel head sleeve being most liable to receive any impact among the members exposed to the exterior of the lens barrel. However, the external bumper component may include an operating member such as a focussing ring. Furthermore, the internal mechanism in the embodiment includes sleeves for shifting the lens units for focussing and members for holding the lens units.

Furthermore, parts of the external and internal mechanisms may be made of a plastic material as part of the buffer or cushion. That is, the buffer may include as a part thereof, a part of the external and/or internal mechanisms. With such a construction, the number of members is reduced, which results in lower manufacturing cost of the lens barrel.

The above and other objects and features of the present invention will be more apparent from the following description taken in connection with the accompanying drawing.

BRIEF DESCRIPTION OF THE DRAWING

The single FIGURE is a medial longitudinal cross-sectional view of a lens barrel according to an embodiment of the present invention.

DESCRIPTION OF THE PREFERRED EMBODIMENTS

Referring now to the drawing which illustrates a preferred embodiment of the present invention in the form of an exchangeable objective lens for use in a single lens reflex camera, the reference number 1 designates a focussing operating ring, a barrel head sleeve 2 having a threaded portion for use in securing attachments thereto and 3, an ornament ring on which are marked the nomenclature of the lens and the like. The members 1, 2, and 3 are exposed to the exterior of the lens barrel. The internal mechanism of the objective lens includes focussing means composed of an outer helicoid sleeve 4 and an inner helicoid sleeve 5, and a holding ring or collar 6 for holding lens groups L1, L2 and L3. The outer helicoid sleeve 4 is integral and rotatable with focussing operating ring 1 and is fitted on the inner helicoid sleeve 5 by means of a helicoid thread. Lens holding ring 6 moves lens groups L1, L2, and L3 as a unit along the optical axis, in response to the shifting of the inner helicoid sleeve 5 along the optical axis. Shown at 7 is buffer or cushion ring made of a synthetic resin of high flexibility and ring 7 threadingly engages the lens head ring 2 as well as the ornamental ring 3, and is secured to inner helicoid sleeve 5 by means of a screw 8.

With the aforesaid arrangement, in the event that an impact is applied to the barrel head sleeve 2 which is most likely to be subjected to an impact, then the impact is neutralized by means of buffer ring 7 by absorbtion and attenuation thereof, to a desired degree, so that inner helicoid sleeve 5 will not be adversely affected. Likewise, in case an impact is applied to ornament ring 3 from front of the lens barrel, the buffer ring 7 will absorb and attenuate the impact. As a result, there is little or no danger of a strong impact being imparted to and acting on inner helicoid sleeve 5 nor on the lens holding ring 6, and thus these members or lenses will not lose their functions nor be damaged.

This embodiment provides a cushion or buffer member for the lens and the internal mechanism, which are most likely to be subjected to an impact. Alternatively, a buffer member may be provided between focussing operating ring 1 and the outer helicoid sleeve 4. The ornament ring 3 or the inner helicoid sleeve in most cases are made of a metal of a high rigidity, but one or both of these members may be molded integrally with buffer ring 7 by using a synthetic resin, with an accompanying saving in manufacturing cost. In the embodiment described, buffer ring 7, barrel head sleeve 2, and ornament ring 3 need not necessarily be threadingly interfitted, but may be simply fitted without using a threaded section.

The principle incorporated in the structure of the present invention may be applied to zoom lens barrels as well as to lens barrels of cameras of the types other than a single lens reflex camera.

While there have been described and illustrated preferred embodiments of the present invention, it is apparent that numerous alterations, additions and omissions may be made without departing from the spirit thereof.

We claim:

1. A lens device comprising:
   a lens barrel;
   a lens unit disposed within said lens barrel;
   an external component including a barrel head sleeve disposed at a forwardmost portion of said lens barrel and exposed to the exterior of said lens barrel so as to receive an impact applied from the front of said lens barrel;
   an internal mechanism disposed between said lens unit and said external component; and
   a buffer coupled to and interposed between said barrel head sleeve and said internal mechanism.

2. A lens device as defined in claim 1, wherein said buffer is made of a plastic material.

3. A lens device as defined in claim 2, wherein said buffer is made of a synthetic resin of high flexibility.

4. A lens device as defined in claim 2, wherein said external component includes an ornament ring disposed in front of said lens unit and coupled to said buffer.

5. A lens device as defined in claim 2, wherein said internal mechanism includes means for shifting said lens unit.

6. A lens device as defined in claim 2, wherein said internal mechanism includes means for holding said lens unit.

7. A lens device as defined in claim 2, wherein said external component includes a portion made of a plastic material and said buffer has said portion as a part thereof.

8. A lens device as defined in claim 2, wherein said internal mechanism includes a portion made of a plastic material and said buffer has said portion as a part thereof.

9. A lens device as defined in claim 5, wherein said barrel head sleeve is axially movable relative to said lens barrel, said lens unit shifting means includes a movable sleeve which is axially movable relative to said lens barrel for shifting said lens unit, and said buffer has a front end coupled to said barrel head sleeve and a rear end coupled to said movable sleeve.

10. A lens device as defined in claim 9, wherein said lens barrel includes a focussing ring accessible for actuating said lens unit shifting means such that said movable sleeve is axially moved relative to said lens barrel.

11. An objective lens comprising:
    a lens barrel;
    a lens unit disposed within said lens barrel;
    an adjusting mechanism disposed within said lens barrel and supporting said lens unit;
    a bumper component projecting axially forwardly of said adjusting mechanism and said lens barrel so as to be directly exposed to impact, applied externally of said lens barrel; and
    an impact attenuating cushion member disposed between and intercoupling said adjusting mechanism and said bumper component.

12. The objective lens of claim 11 wherein said bumper member comprises a ring.

13. The objective lens of claim 12 wherein said bumper ring is formed of metal and said cushion member comprises a ring formed of a synthetic polymeric resin coaxial with and directly joined to said bumper ring.

* * * * *